United States Patent
Kim et al.

(10) Patent No.: US 9,886,702 B2
(45) Date of Patent: Feb. 6, 2018

(54) METHOD OF CREATING AND JOINING SOCIAL GROUP, USER DEVICE FOR EXECUTING THE METHOD, SERVER, AND STORAGE MEDIUM

(75) Inventors: Young-suk Kim, Gyeonggi-do (KR); Jong-myeong Ban, Seoul (KR); Jung-shin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 490 days.

(21) Appl. No.: 13/242,986

(22) Filed: Sep. 23, 2011

(65) Prior Publication Data

US 2012/0079022 A1 Mar. 29, 2012

(30) Foreign Application Priority Data

Sep. 28, 2010 (KR) .................. 10-2010-0093801

(51) Int. Cl.
| | |
|---|---|
| *G06F 15/16* | (2006.01) |
| *G06Q 30/02* | (2012.01) |
| *H04L 29/08* | (2006.01) |
| *G06Q 50/00* | (2012.01) |

(52) U.S. Cl.
CPC ......... *G06Q 30/0261* (2013.01); *G06Q 50/01* (2013.01); *H04L 67/104* (2013.01); *H04L 67/1044* (2013.01); *H04L 67/1046* (2013.01); *H04L 67/1048* (2013.01); *H04L 67/1051* (2013.01)

(58) Field of Classification Search
CPC .............. H04L 67/104; H04L 67/1044; H04L 67/1046; H04L 67/1048; H04L 67/1051; H04W 4/08

USPC .......................................... 709/204; 455/518
See application file for complete search history.

(56) References Cited

U.S. PATENT DOCUMENTS

| | | | |
|---|---|---|---|
| 8,539,359 B2 * | 9/2013 | Rapaport et al. | 715/751 |
| 8,577,405 B2 * | 11/2013 | Davis et al. | 455/518 |
| 8,738,279 B2 * | 5/2014 | Radhakrishnan | G06Q 50/01 |
| | | | 701/300 |

(Continued)

FOREIGN PATENT DOCUMENTS

| | | |
|---|---|---|
| CN | 101044504 | 9/2007 |
| CN | 101065747 | 10/2007 |

(Continued)

OTHER PUBLICATIONS

Silja et al (Robust Membership Management, for Ad-hoc Groups, Helsinki University of Technology; Laboratory for Theoretical Computer Science FIN-02015 HUT, Finland, 2000.*

(Continued)

*Primary Examiner* — Shirley Zhang
(74) *Attorney, Agent, or Firm* — The Farrell Law Firm, P.C.

(57) ABSTRACT

A method, user device, server, and storage medium for creating and joining a social group performed by a user device are provided. The method for creating the social group includes receiving information corresponding to a current location of the user device; receiving at least one social group condition information item; and sending a request to create a social group based on the information corresponding to the current location and the at least one social group condition information item to an external device.

11 Claims, 8 Drawing Sheets

(56) References Cited

U.S. PATENT DOCUMENTS

| | | | | |
|---|---|---|---|---|
| 8,855,698 | B2* | 10/2014 | Gonsalves | H04L 12/1822 455/517 |
| 8,886,833 | B1* | 11/2014 | Kopikare | H04L 29/08351 709/227 |
| 2002/0082035 | A1* | 6/2002 | Aihara et al. | 455/518 |
| 2004/0122803 | A1* | 6/2004 | Dom et al. | 707/3 |
| 2006/0059142 | A1 | 3/2006 | Zvinyatskovsky et al. | |
| 2006/0085419 | A1* | 4/2006 | Rosen | G06F 17/3087 |
| 2006/0242234 | A1* | 10/2006 | Counts et al. | 709/204 |
| 2007/0237096 | A1* | 10/2007 | Vengroff et al. | 370/254 |
| 2008/0140650 | A1* | 6/2008 | Stackpole | G06F 17/3087 |
| 2009/0215469 | A1* | 8/2009 | Fisher et al. | 455/456.3 |
| 2010/0015991 | A1* | 1/2010 | Evans | H04L 12/581 455/456.1 |
| 2010/0036912 | A1 | 2/2010 | Rao | |
| 2010/0070758 | A1 | 3/2010 | Low et al. | |
| 2010/0255781 | A1* | 10/2010 | Wirola et al. | 455/41.2 |
| 2010/0317392 | A1* | 12/2010 | Davis | H04W 4/001 455/518 |
| 2011/0022529 | A1* | 1/2011 | Barsoba et al. | 705/319 |
| 2012/0047565 | A1* | 2/2012 | Petersen | 726/7 |
| 2012/0052863 | A1* | 3/2012 | Chien et al. | 455/436 |

FOREIGN PATENT DOCUMENTS

| | | |
|---|---|---|
| CN | 101645933 | 2/2010 |
| JP | 2001-249877 | 9/2001 |
| JP | 2007-306409 | 11/2007 |
| JP | 2008-140174 | 6/2008 |
| JP | 2009-87044 | 4/2009 |
| JP | 2010-217958 | 9/2010 |
| KR | 1020020028068 | 4/2002 |
| KR | 1020070052628 | 5/2007 |
| KR | 1020090081579 | 7/2009 |
| KR | 1020100004682 | 1/2010 |

OTHER PUBLICATIONS

Japanese Office Action dated Nov. 4, 2014 issued in counterpart application No. 2013-531480.
Wikipedia, "Location-Based Service", XP055113886, Sep. 11, 2010.
Wikipedia, "Geosocial Networking", XP055113887, Sep. 9, 2010.
Wikipedia: "Real-time Locating System", Internet Article, XP055194565, Sep. 21, 2010, 6 pages.
Wikipedia: "Mobile Dating", Internet Article, XP055194708, Aug. 17, 2010, 3 pages.
Chinese Office Action dated Jul. 3, 2015 issued in counterpart application No. 201180046796.9, 26 pages.
Summons to attend oral proceedings dated Jul. 21, 2015 issued in counterpart application No. 11829531.0-1958, 11 pages.
Chinese Office Action dated Mar. 4, 2016 issued in counterpart application No. 201180046796.9, 25 pages.
Chinese Office Action dated Sep. 5, 2016 issued in counterpart application No. 201180046796.9, 23 pages.
Chinese Office Action dated Jun. 19, 2017 issued in counterpart application No. 201180046796.9, 15 pages.
Chinese Office Action dated Nov. 11 2017, issued in counterpart application No. 201180046796.9, 32 pages.

* cited by examiner

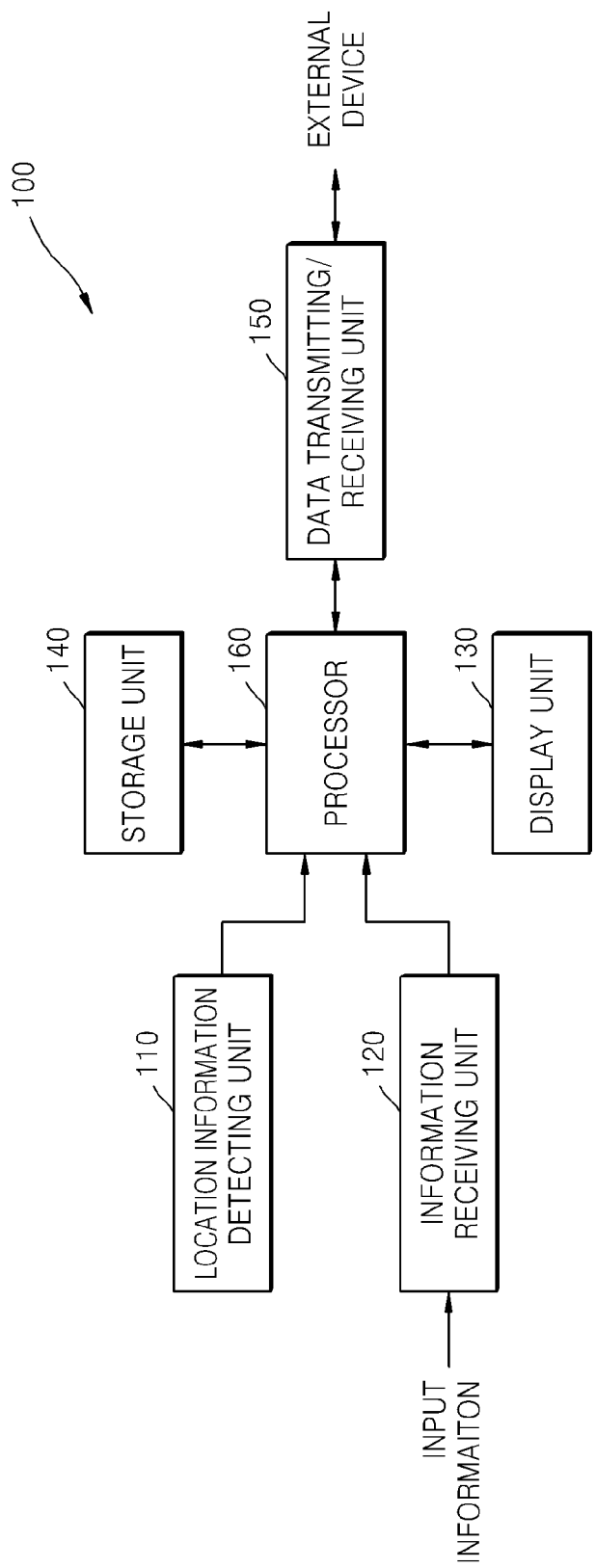

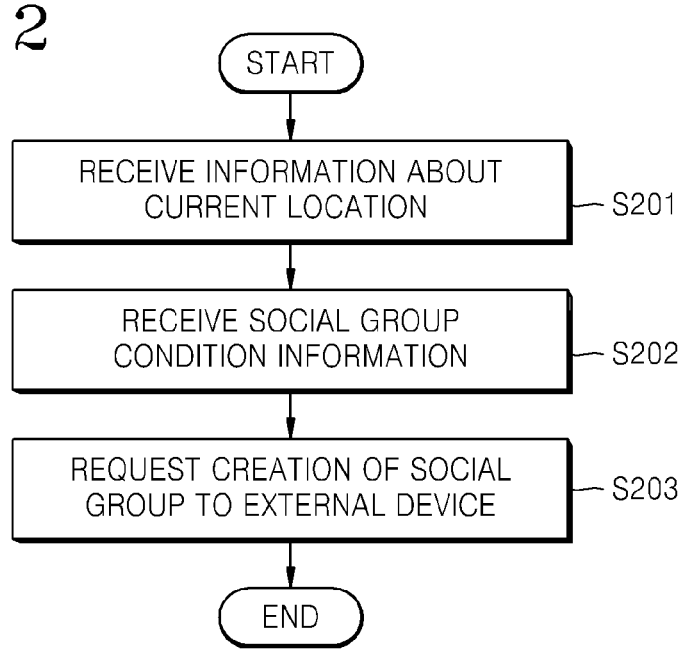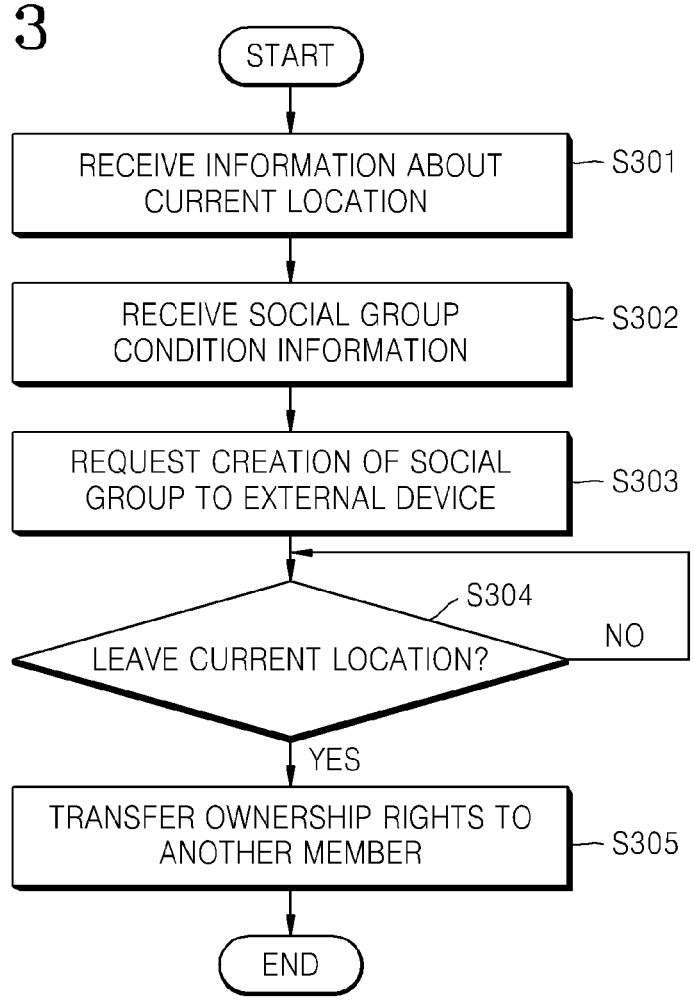

METHOD OF CREATING AND JOINING SOCIAL GROUP, USER DEVICE FOR EXECUTING THE METHOD, SERVER, AND STORAGE MEDIUM

PRIORITY

This application claims priority to Korean Patent Application No. 10-2010-0093801, filed on Sep. 28, 2010, in the Korean Intellectual Property Office, the entire disclosure of which is incorporated herein by reference.

BACKGROUND OF THE INVENTION

1. Field of the Invention

The present invention relates generally to a social network service, and more particularly, to a method of creating and joining a social group, a user device for executing the method, a server, and a computer-readable storage medium.

2. Description of the Related Art

Currently, as various mobile devices, including smartphones, are widely distributed, various mobile device services are provided. Among such mobile device services, a social network service is a common service.

A social network service may be a web-based and/or an online-based service. A social network service may include various types of services, the most-commonly used of which is a service for creating and joining a social group. In general, social network services for creating and joining a social group may be based on an individual's school information and/or personal information such as a website corresponding to a school, personal preference information, and/or personal geographical location information.

However, a social network service generally creates social groups based on information extracted from information (for example, interest information of a user and location information of a user device) collected from user devices connected to a specific web site or a server for providing a network service. Accordingly, the social groups may be created based on information collected from at least two user devices. However, social groups may not be created based on information collected from a single user device.

Also, users may be provided with a social network service by joining a social group created in a specific website or a specific server with their devices; however, may not actively participate when creating a social group in a specific website or a specific server. More specifically, when a social group is created in a specific website or a specific server, users may not be able to request creation of a social group meeting the user's desired conditions.

SUMMARY OF THE INVENTION

Accordingly, an aspect of the present invention is to solve the above-mentioned problems, and to provide a method of creating and joining a social group based on information about a social group condition set by a user and about location, and a user device, a server, and a computer-readable storage medium for executing the method.

According to an aspect of the present invention, a method of creating a social group performed by a user device is provided. The method includes receiving information corresponding to a current location of the user device; receiving at least one social group condition information item; and sending, to an external device, a request to create a social group based on the information corresponding to the current location and the at least one social group condition information item.

According to another aspect of the present invention, a method of joining a social group performed by a user device is provided. The method includes sending, to an external device, a request for a social group list based on information corresponding to a current location of the user device; receiving the social group list from the external device in the user device; filtering the received social group list based on social group condition information set in the user device; and joining a social group selected from the filtered social group list.

According to another aspect of the present invention, a method of creating and joining a social group performed by an external device is provided. The method includes creating, upon receiving a request to create a social group from first user device based on information corresponding to a current location of the first user device and at least one social group condition information, the social group; and transmitting, upon receiving a request for a social group list from a second user device based on the information corresponding the current location, the social group list including information corresponding to the created social group to the second user device.

According to another aspect of the present invention, a method of creating and joining a social group performed by a user device is provided. The method includes detecting information corresponding to a current location of the user device; receiving at least one social group condition information item; sending, to an external device, a request to create a social group based on the information about a current location of the user device and the at least one social group condition information item; and joining the created social group based on the information about the current location.

According to another aspect of the present invention, a non-transitory computer-readable storage medium having embodied thereon a computer program for executing a method of creating a social group performed by a user device is provided. The method includes receiving information corresponding to a current location of the user device; receiving at least one social group condition information item; and sending, to an external device, a request to create a social group based on the information corresponding to the current location and the at least one social group condition information item.

According to another aspect of the present invention, a non-transitory computer-readable storage medium having embodied thereon a computer program for executing a method of joining a social group performed by a user device is provided. The method includes sending, to an external device, a request for a social group list based on information corresponding to a current location of the user device; receiving the social group list from the external device in the user device; filtering the received social group list based on social group condition information set in the user device; and joining a social group selected from the filtered social group list.

According to another aspect of the present invention, a non-transitory computer-readable storage medium having embodied thereon a computer program for executing a method of creating and joining a social group performed by an external device is provided. The method includes creating, upon receiving a request to create a social group from first user device based on information corresponding to a current location of the first user device and at least one social group condition information, the social group; and transmitting, upon receiving a request for a social group list from a second user device based on the information corresponding the current location, the social group list including information corresponding to the created social group to the second user device.

According to another aspect of the present invention, a non-transitory computer-readable storage medium having embodied thereon a computer program for executing a method of creating and joining a social group performed by a user device is provided. The method includes detecting information corresponding to a current location of the user device; receiving at least one social group condition information item; sending, to an external device, a request to create a social group based on the information about a current location of the user device and the at least one social group condition information item; and joining the created social group based on the information about the current location.

According to another aspect of the present invention, a user device is provided. The user device includes a location information detecting unit for detecting information corresponding to a current location of the user device; an information receiving unit for receiving at least one social group condition information item; a data transmitting/receiving unit for communicating with an external device; and a processor for sending, to an external device through the data transmitting/receiving unit, a request to create a social group based on the information corresponding to current location and the at least one social group condition information item.

According to another aspect of the present invention, a server is provided. The server includes a data transmitting/receiving unit for communicating with at least one user device; a storage unit for storing information corresponding to a created social group; and a processor for creating, when the information about a current location of at least one user device and the social group condition information are received from the at least one user device through the data transmitting/receiving unit, a social group based on information about the current location and social group condition information, for storing information about the created social group in the storage unit, and for transmitting, when a request of the social group list is received from a user device based on the information about the current location through the data transmitting/receiving unit, a social group list based on the information stored in the storage unit to the requesting user device that requested the social group list.

BRIEF DESCRIPTION OF THE DRAWINGS

The above and other features and advantages of the present invention will become more apparent by describing in detail embodiments thereof with reference to the attached drawings in which:

FIG. 1 is a functional block diagram illustrating a user device according to an embodiment of the present invention;

FIG. 2 is a flowchart illustrating a method of creating a social group in a user device, according to an embodiment of the present invention;

FIG. 3 is a flowchart illustrating a method of creating a social group in a user device, according to another embodiment of the present invention;

DETAILED DESCRIPTION OF EMBODIMENTS OF THE INVENTION

Figure 4:
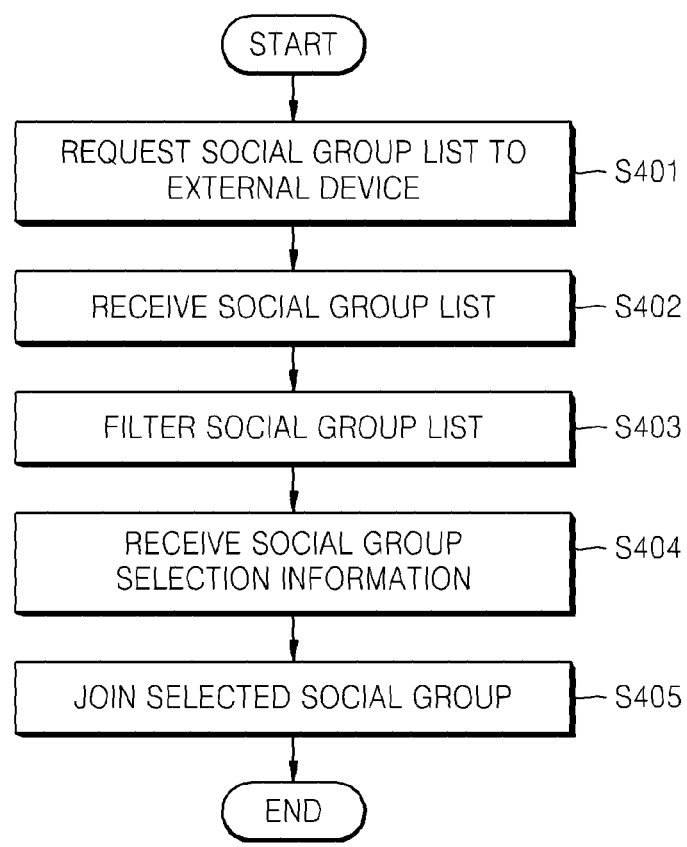
FIG. 4 is a flowchart illustrating a method of joining a social group in a user device, according to an embodiment of the present invention.

Hereinafter, embodiments of the present invention are described in detail with reference to the accompanying drawings. In the following description, specific details such as detailed configuration and components are presented to assist in providing an overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

FIG. 1 is a functional block diagram illustrating a user device according to an embodiment of the present invention.

Referring to FIG. 1, a user device 100 may be a mobile device, and may access an external device (not illustrated) through a wired/wireless network. However, the user devices in accordance with embodiments of the present invention are not limited to such mobile devices. Mobile devices in accordance with embodiments of the present invention may include, but are not limited to, any of a variety of devices including a mobile phone, a Motion Picture Experts' Group (MPEG) Audio Layer-3 MP3 player, a navigation device, a Personal Digital Assistant (PDA), etc. The wired/wireless network may include, but is not limited to, a local area network, and/or an Internet network, etc. The external device is a server that may provide a social network service, or a device or an apparatus corresponding to the server.

Referring to FIG. 1, the user device 100 includes a location information detecting unit 110, an information receiving unit 120, a display unit 130, a storage unit 140, a data transmitting/receiving unit 150, and a processor 160. However, the user device 100 may include additional elements other than the elements illustrated in FIG. 1, or may alternatively include fewer elements than the elements illustrated in FIG. 1. For example, the information receiving unit 120 and the display unit 130 may be combined with each other to constitute a user interface unit. The user interface unit allows interaction between the user device 100 and a user. The display unit 130 may be an output unit. The storage unit 140 or the data transmitting/receiving unit 150 may be included in the processor 160.

The location information detecting unit 110 detects information about a current location of the user device 100 based on a Global Positioning System (GPS) or a location identification system based on a base station. The information about a current location may be detected periodically and/or may be detected according to movement of the user device 100.

The information receiving unit 120 receives user input information (or an input signal). The information receiving unit 120 may receive user input information from a remote location and/or receive a direct input information signal such as a touch signal, a key signal, or a mouse manipulation signal. The input information received according to the embodiments of the present invention may include, for example, condition information of a social group to be created or condition information of a social group to be joined. The social group condition information may include condition information about group members. The condition information about group members may include, for example, frequency information indicating the number of and/or frequency of visits to a specific store, occupation information, or specific on-line community information. The condition information of a social group to be created is referred to as social group creation condition information herein. The condition information of a social group to be joined is referred to as social group joining condition information herein. The social group condition information may also be referred to as additional information input by the user device 100 at a specific location.

The display unit 130 may display information about a social group list received from an external device, information about a social group selected from the social group list, and social network service information based on the selected social group. For example, for a social group determined according to customers who visit a specific store more than 10 times, the social network service information to be displayed may include discount coupon information of the specific store. For example, for a social group based on customers having a particular occupation A from among customers who visit the Seoul Arts Center, social network service information to be displayed may include contents related to occupation A.

The display unit 130 may be any of a variety display devices including, but not limited to, a Liquid Crystal Display (LCD), a Light Emitting Diode (LED) device, an Active-Matrix Organic Light-Emitting Diode (AMOLED) device, etc.

The storage unit 140 stores an application program and data required to execute a method of creating a social group, a method of joining a social group, and/or a method of both creating and joining a social group according to embodiments of the present invention. The data includes the social group condition information used when creating and joining a social group and information about members of a social group. The members of the social group include users having a communication device at a geographical location where the social group is generated.

The information about members of a social group may be provided from an external device (not illustrated) through the data transmitting/receiving unit 150. However, this information may be generated by the processor 160 based on identification information of a user device collected based on a current location through the data transmitting/receiving unit 150. For example, the processor 160 can collect identification information corresponding to a communication device located within a store, where the user device 100 is currently located, through the data transmitting/receiving unit 150, create or update information about members of a social group based on the store where the user device 100 is currently located by using the collected information, and store the created or updated information about members of the social group based on the store in the storage unit 140. A method of collecting social group member information by the user device 100, instead of by the external device, may be performed by beacon protocol or Radio Frequency IDentification (RFID).

The data transmitting/receiving unit 150 transmits and receives data to and from the external device. When the external device and the user device 100 access each other through a network, the data transmitting/receiving unit 150 may include a network interface function. The data transmitting/receiving unit 150 may further collect identification information of a communication device other than the user device 100 existing within a limited range, such as a specific store.

The processor 160 controls all functions of the user device 100. The processor 160 may be a controller or a microprocessor. However, the processor 160 is not limited thereto. The processor 160 may operate by loading a program stored in the storage unit 140 onto the processor 160. The program may be initially stored in the storage unit 140 when manufacturing the user device 100. However, the program may alternatively be stored in the storage unit 140 after the initial manufacture, such as through a download from an external device (not illustrated) through the data transmitting/receiving unit 150. Here, the external device (not illustrated) may be a server such as an app store server. However, the external device is not limited to these methods for storing the program, and other methods for storing the program may be used in accordance with embodiments of the present invention.

The processor 160 may generate a request for creating a social group to be transmitted to an external device (not illustrated) through the data transmitting/receiving unit 150 based on current location information received from the location information detecting unit 110 and the social group condition information received from the information receiving unit 120. Here, the external device may be a server that provides a social network service, a device, or an apparatus. Herein, the location information detection unit 110 may be referred to as a position information detection unit, and the current location information may be referred to as current position information.

FIG. 2 is a flowchart illustrating a method of creating a social group in a user device according to an embodiment of the present invention. The processor 160 may operate as illustrated in FIG. 2.

Referring to FIG. 2, the processor 160 receives current location information detected in the location information detecting unit 110 corresponding to a current location of the user device 100, in step S201. For example, if the user device 100 is located at a specific store, the information corresponding to a current location may be the name of the store where the user device 100 is located. If the user device 100 is located at Seoul Arts Center, the current location information may be the Seoul Arts Center.

The processor 160 receives at least one social group condition information item from the information receiving unit 120, in step S202. If the user device 100 initiates creation of a social group based on regular customers of the store, the social group condition information may be information about frequency of visiting the store. If the user device 100 initiates creation of a social group for providing or sharing contents specifically related to occupations of people who visit the Seoul Arts Center, the social group condition information may be information indicating people's occupations. If the user device 100 initiates creation of a social group for providing or sharing contents specifically related to a combination of occupations of people who visit the Seoul Arts Center and frequency of visiting, the social group condition information may be information about occupation and frequency of visiting the Seoul Arts Center. If the user device 100 initiates creation of a social group including people who work within the user's on-line community from among people who visit a specific store, the social group condition information may be information about the on-line community. As such, the social group condition information may include condition information about members of a social group and may be based on input information of the user device 100.

When the processor 160 receives information about a current location of the user device 100 and the social group condition information, the processor 160 sends a request in step S203 to create a social group based on the received current location information and the social group condition information to an external device (not illustrated) through the data transmitting/receiving unit 150. Accordingly, the external device creates a social group having social group conditions according to a request of the user device 100 and may provide a social network service targeted by a user of the user device 100. Here, members of the social group created by the external device may only include a group creator that is also an owner of the social group, i.e., a one-person social group based on a location may be created according to an embodiment of the present invention.

FIG. 3 is a flowchart illustrating a method of creating a social group in a user device according to another embodiment of the present invention. The processor 160 may operate as illustrated in FIG. 3. The method of FIG. 3 further includes a function of transferring ownership of a social group when the user device 100 leaves the current location corresponding to the method of FIG. 2. Accordingly, steps S301 through S303 in FIG. 3 are respectively the same as steps S201 through S203 in FIG. 2, and thus a detailed description thereof will not be repeated for clarity and conciseness.

Referring to FIG. 3, in step S304, as a result of monitoring current location information received from the location information detecting unit 110 corresponding to a current location, when the user device 100 leaves the current location, the processor 160 transfers ownership rights of a social group to another member of the social group, in step S305. If there are no other members of the social group, the social group may cease to operate, become extinct, or may be cancelled. However, as a result of monitoring information about a current location, when the user device 100 remains in the current location, the social group created by the user device 100 continues to operate. Similarly, if ownership rights are transferred to another member of the social group, to which ownership rights are transferred when the user device 100 leaves the current location, the social group created by the user device 100 continues to operate.

Existence of another member of the social group may be determined based on device information existing at a location where a social group stored in the storage unit 140 is created. If information corresponding to a plurality of members exists in the storage unit 140, the processor 160 outputs the member information to the display unit 130 in order to enable a user to directly select one member or select one member according to condition information previously set in the processor 160. The condition information used to select the member may be previously set based on information corresponding to an order at which users arrive at the location, information indicating where a social group is created, or information indicating a frequency of visits to the location.

The processor 160 transmits an inquiry about acceptance of transference of ownership to a selected member device (not illustrated) through the data transmitting/receiving unit 150. In this regard, when a message indicating acceptance of transference of ownership is received from the selected member device, transference of ownership to another member is completed.

The monitoring of current location information may be performed by determining whether the information about a current location has changed, based on a geographical location. Here, the information about a current location may be the name of a location such as the name of a specific store. When the information about a current location changes due to geographical location movement, the processor 160 may determine that the user device 100 has left a current location.

FIG. 4 is a flowchart illustrating a method of joining a social group in a user device, according to an embodiment of the present invention. The processor 160 included in the user device 100 may operate as illustrated in FIG. 4 in order to perform a function of joining a social group according to the present invention.

Referring to FIG. 4, the processor 160 sends a request for a social group list to an external device through the data transmitting/receiving unit 150 based on current location information received from the location information detecting unit 110 about a current location of the user device 100, in step S401. Upon receiving the social group list from the external device, in step S402, the processor 160 filters the received social group list based on social group condition information stored in the storage unit 140, in step S403.

The social group condition information may be similar to or the same as the social group condition information used when creating a social group. The social group condition information may include at least one of input information of the user device 100 received through the information receiving unit 120 and information received through the data transmitting/receiving unit 150 according to movement of the user device 100. Information to be collected according to the movement of the user device 100 may include, for example, information about frequency of visits to the current location. Information about the name of a specific store, and a counted frequency of visits of the user device 100 to the specific store may be stored in the storage unit 140 as the social group condition information every time the user device 100 visits the specific store.

The processor 160 outputs the filtered social group list to the display unit 130. When the processor 160 receives information about a social group selected by the user from the information receiving unit 120 based on the social group list displayed on the display unit 130, in step S404, the processor 160 adds the user device 100 to the selected social group through the data transmitting/receiving unit 150, in step S405.

Figure 5:
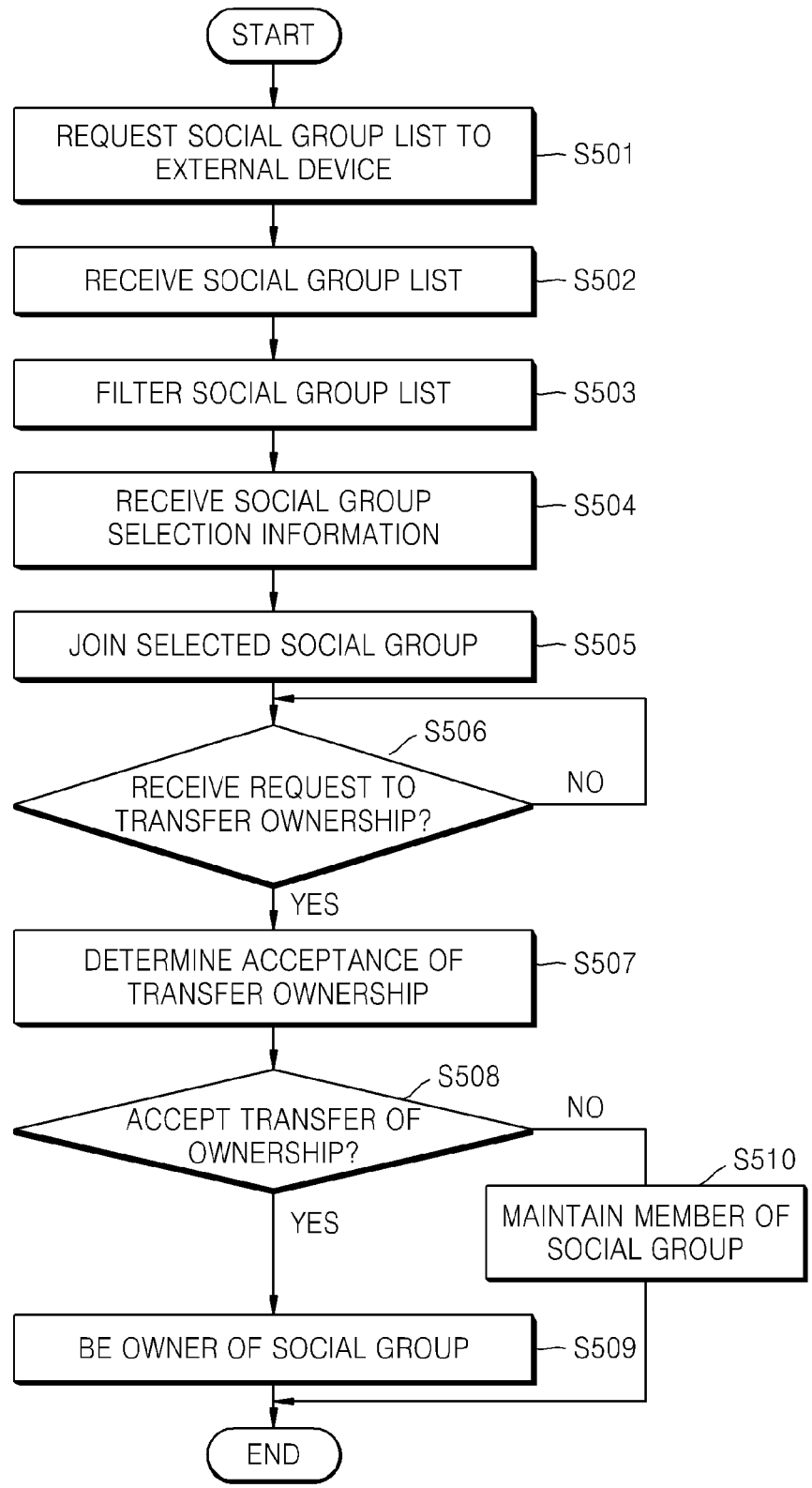
FIG. 5 is a flowchart illustrating a method of joining a social group in a user device, according to another embodiment of the present invention.

FIG. 5 is a flowchart illustrating a method of joining a social group in a user device, according to another embodiment of the present invention. The processor 160 may operate as illustrated in FIG. 5. The method of FIG. 5 further includes a function of transferring ownership of a social group, such as the social group described herein with reference to FIG. 4. Accordingly, step S501 through S505 in FIG. 5 are respectively the same as steps S401 through S405, and thus a detailed description thereof is omitted for clarity and conciseness.

Referring to FIG. 5, in step S506, when a request for transferring ownership is received from the user device 100, which is an owner of a social group, the processor 160 outputs a message corresponding to the request for transferring ownership to the display unit 130. After outputting the message, the processor 160 determines whether transference of ownership of the social group, to which the user device 100 currently is joined, has been accepted by the user by using information input through the information receiving unit 120, in step S507. For example, when information indicating acceptance of transferring ownership of the social group is received through the information receiving unit 120, in response to the display of the message displayed on the display unit 130, the processor 160 determines that the user device 100 accepts transference of ownership. However, when information indicating refusal of transferring ownership of the social group is received through the information receiving unit 120, the processor 160 determines that the user device 100 does not accept transference of ownership.

Upon determining that the processor 160 accepts transference of ownership, in step S508, the processor 160 allows the user device 100 to receive ownership of a currently joined social group, in step S509. However, upon determining that the processor 160 has not accepted transference of ownership, in step S508, the processor 160 allows the user device 100 to continue membership within the currently joined social group, in step S510. Here, a device that currently has ownership of the social group searches for another member and performs transference of ownership again. When there are no members to which ownership is transferred, the processor 160 may be forced to allow the user device 100 into ownership of the social group according to information received from the owner device through the data transmitting/receiving unit 150.

The social group described with reference to FIGS. 4 and 5 is different from the social group in the social group described with reference to FIGS. 2 and 3. More specifically, the social group of FIGS. 2 and 3 is created by the user device 100, which is also the owner of the social group. Meanwhile, the social group of FIGS. 4 and 5 is not created by the user device 100, which becomes member of the group based on a location of the user device 100.

Figure 6:
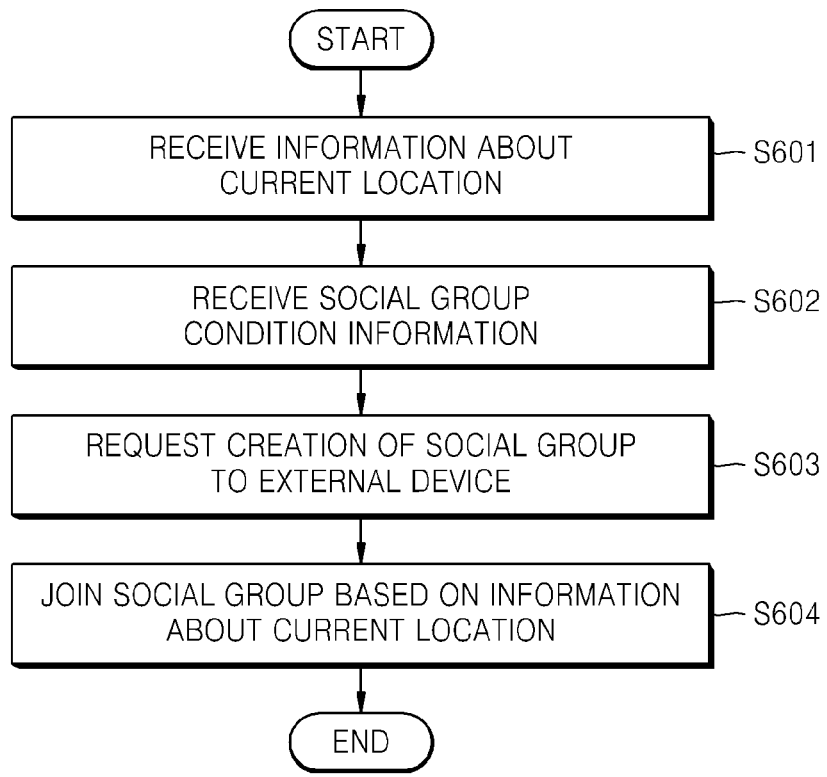
FIG. 6 is a flowchart illustrating a method of creating and joining a social group in a user device, according to an embodiment of the present invention.

FIG. 6 is a flowchart illustrating a method of creating and joining a social group in a user device, according to an embodiment of the present invention.

Referring to FIG. 6, steps S601 through S603 in FIG. 6 are the same as steps S201 through S203 in FIG. 2, respectively, and thus a further detailed description of steps S601 through S603 is not repeated for clarity and conciseness.

In steps S601 through S603, the user device 100 sends a request for creating a social group to an external device. In step S604, the processor 160 adds the user device 100 to a social group selected from the social group list received through the data transmitting/receiving unit 150, where the received social group list is based on the information about a current location. The user device 100 may join the social group in step S604 in a manner similar to that described with reference to FIG. 4 or FIG. 5. The social group list received in step S604 may include information about the social group requested in step S603. The selected social group may be the requested social group, or may be a social group other than the requested social group.

Figure 7:
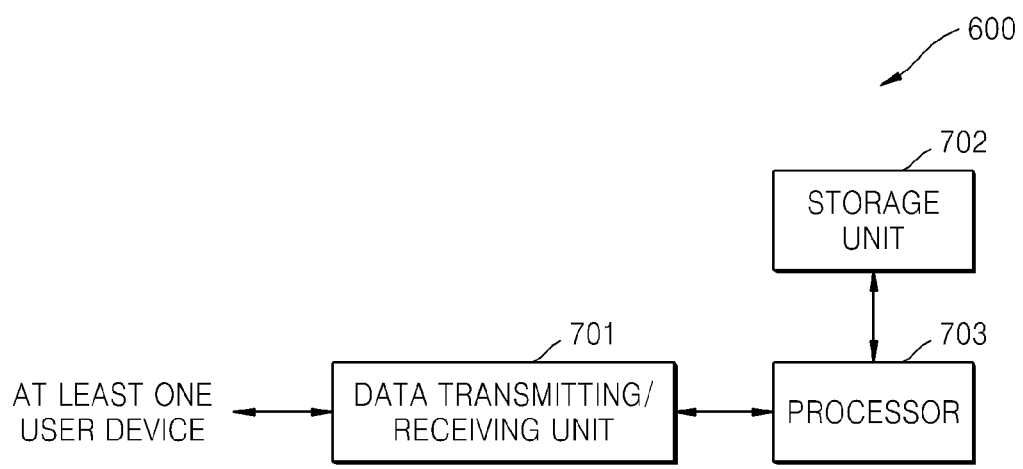
FIG. 7 is a block diagram illustrating a server according to an embodiment of the present invention.

FIG. 7 is a block diagram illustrating a server according to an embodiment of the present invention.

Referring to FIG. 7, a server 700 may be the external device of FIG. 1. The server 700 includes a data transmitting/receiving unit 701, a storage unit 702, and a processor 703. However, in accordance with alternative embodiments of the present invention, the server 700 may include additional elements other than the elements illustrated in FIG. 7, or may include fewer elements than the elements illustrated in FIG. 7.

The data transmitting/receiving unit 701 transmits/receives data to/from at least one user device 100. When the user device 100 and the server 700 are connected to each other by a wired or wireless network, the data transmitting/receiving unit 701 may be called a network interface unit.

The storage unit 703 stores information about a social group created according to a request by the user device 100. More specifically, the storage unit 703 may store information about a location corresponding to the created social group, information about a social group matched with group condition information, information about a social group list based on the location information and the group condition information of the created social group, or information about members of a social group.

Figure 8:
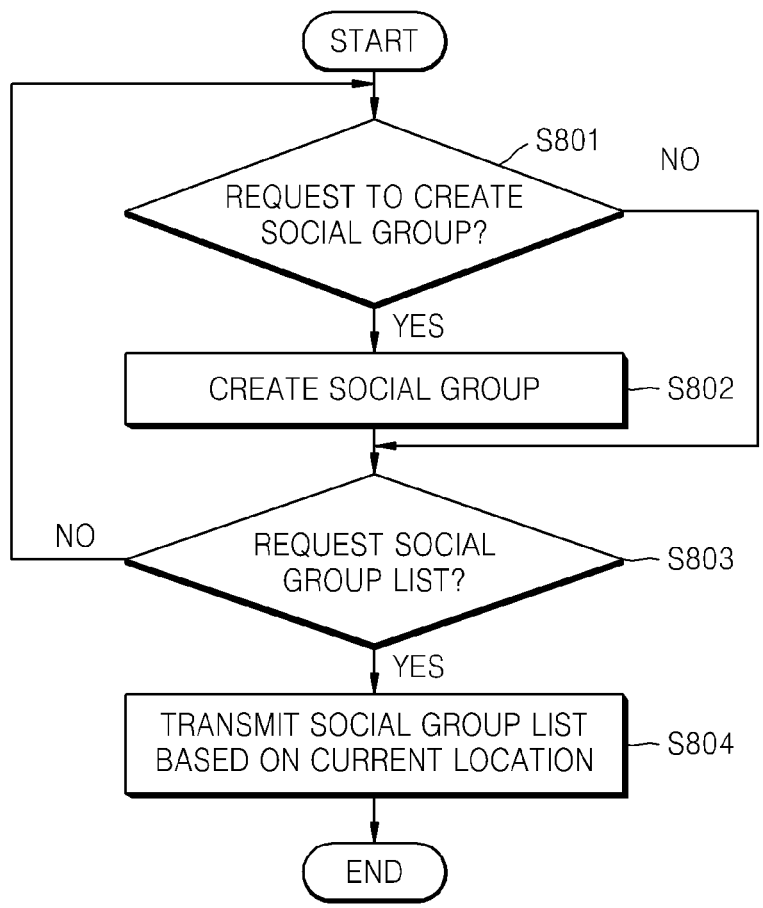
FIG. 8 is a flowchart illustrating a method of creating and joining a social group in a server, according to an embodiment of the present invention.

The processor 703 may operate as illustrated in FIG. 8. FIG. 8 is a flowchart illustrating a method of creating and joining a social group in a server, according to an embodiment of the present invention.

Referring to FIG. 8, if a first user device requests creation of a social group based on information about a current location of the first user device and at least one social group condition information item the processor 703 of the server 700 creates a social group, in step S802. However, if the server 700 does not receive a request to create a social group in step S801, the server 700 determines whether a social group list based on current location information is requested, in step S803.

When there is no request for a social group list based on the information about a current location, the processor 703 returns to step S801.

Otherwise, upon a determination that the social group list is requested in step S803, the processor 703 transmits the social group list for the social group created based on the information about a current location to a second user device through the data transmitting/receiving unit 701, in step S804. The first user device and the second user device may be the same or different devices.

Figure 9:
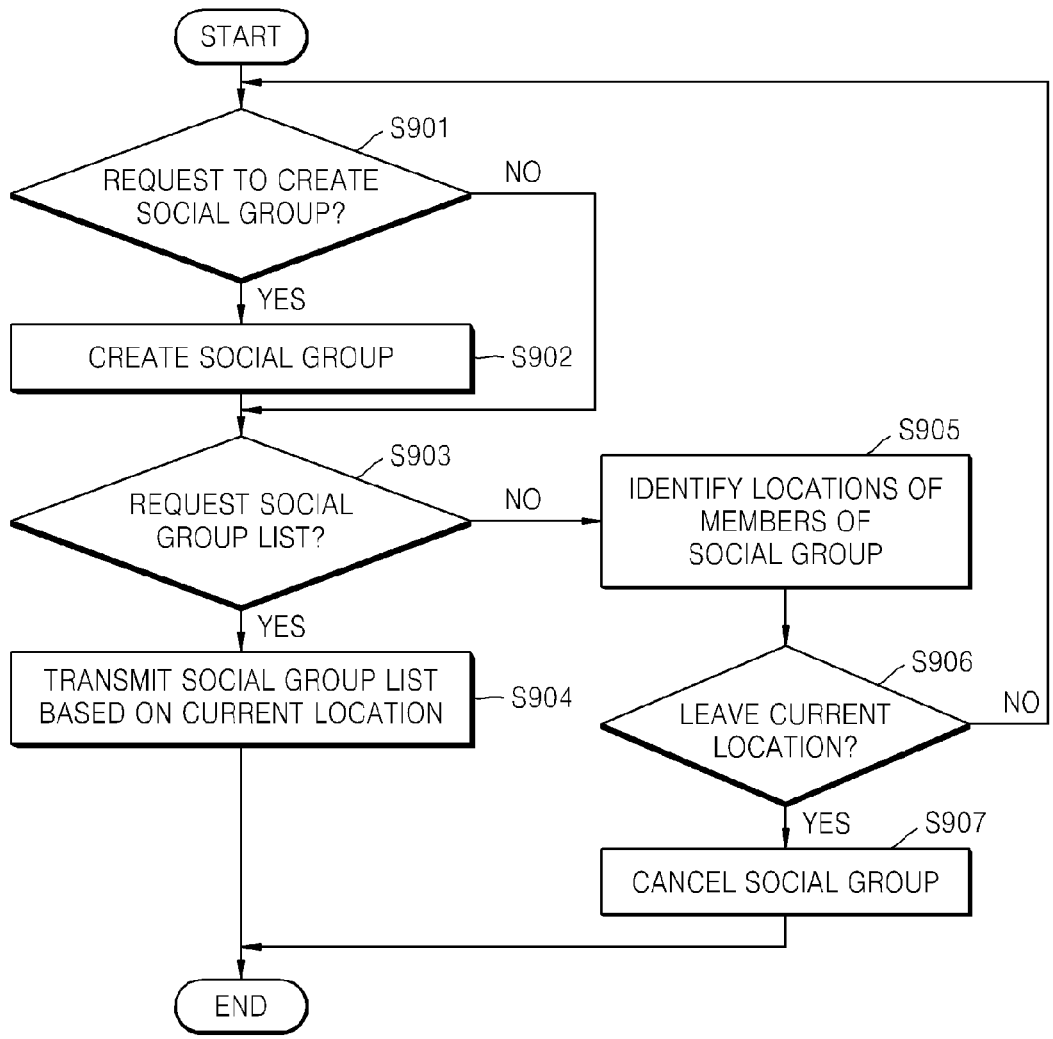
FIG. 9 is a flowchart illustrating a method of creating and joining a social group in a server, according to another embodiment of the present invention.

The processor 703 may operate as illustrated in FIG. 9. FIG. 9 is a flowchart illustrating a method of creating and joining a social group in a server according to another embodiment of the present invention. FIG. 9 further includes a function of cancelling a social group corresponding to the flowchart of FIG. 8.

Referring to FIG. 9, steps S901 through S904 in FIG. 9 are the same as operations S801 through S804 in FIG. 8, respectively, and thus a detailed description of steps S901 through S904 is not repeated for clarity and conciseness.

In step S905, the processor 703 of the server 700 identifies locations of each member of a social group based on information received through the data transmitting/receiving unit 701. As a result, upon a determination that all members of a social group have left a current location, in step S906, the processor 703 deletes the information about the social group from the storage unit 702 and ceases operation of, terminates, or cancels the social group, in operation S907. The determination that all members have left the current location, in operation S906, may correspond to a determination that there are no members to which ownership of the corresponding social group may be transferred. A determination that all members have left a group based upon the ability to transfer ownership to another member may correspond to a scenario where a social group creator requests to transfer an ownership, but there are no other members to which ownership may be transferred.

Figure 10:
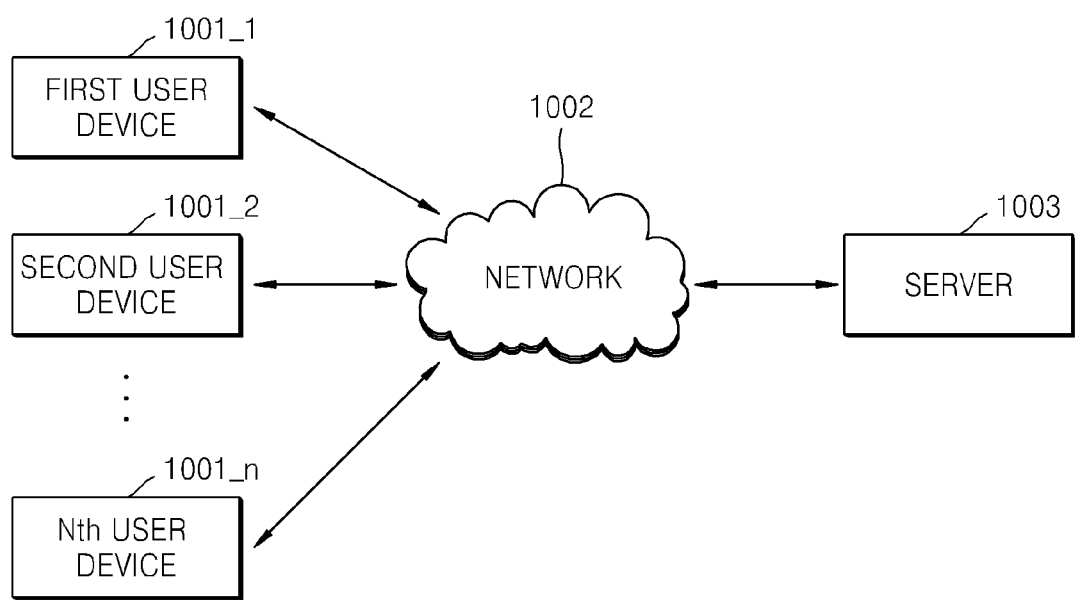
FIG. 10 is a block diagram illustrating a network system, to which user devices and a server corresponding to an external device are connected, according to an embodiment of the present invention.

FIG. 10 is a block diagram illustrating a network system, to which user devices and a server corresponding to an external device are connected, according to an embodiment of the present invention.

Referring to FIG. 10, the first through nth user devices 1000_1 to 1000_n may send, to an accessible server 1003, a request for creation of a social group according to a requested social group condition, through the network 1002. In response to the request, the server 1003 creates and stores the social group. When at least one user device from among the first through nth user devices 1000_1 to 1000_n requests creation of a social group, the server 1003 creates the social group, even if there are no other user devices at a location corresponding to the request, which accordingly results in creation of a social group that has only one member. Also, a target member to be added to the social group may be specified based on social group condition information designated by a social group creator.

The social group may continue to operate while the social group creator is located at a location where the social group is created. According to embodiments of the present invention, only users that have a device at the corresponding location are recognized as members in the created social group. Therefore, a user of a device that leaves the current location is automatically removed from the social group, such that a social network service corresponding to the social group is no longer provided. In addition, if there are not any devices to which ownership may be transferred, when a first user device that has created a social group corresponding to a location, leaves the location corresponding to the social group, a server ceases operation of, terminates, or cancels the corresponding social group.

The "current location" referred to with respect to the above-described embodiments of the present invention, may include small regions such as stores, but may also include larger regions such as cities or countries.

Embodiments of the present invention may include computer-readable codes on a non-transitory computer-readable recording medium. Such a computer-readable recording medium may be any data storage device that can store data that can be thereafter read by a computer system. Examples of such computer-readable recording mediums include Read-Only Memory (ROM), Random-Access Memory (RAM), Compact Disc (CD)-ROMs, magnetic tapes, floppy disks, and optical data storage devices. The computer-readable recording medium can also be distributed over network-coupled computer systems so that the computer-readable code is stored and executed in a distributed fashion.

Although the present invention is shown and described with reference to certain embodiments thereof, it will be understood by those of ordinary skill in the art that various changes in form and details may be made therein without departing from the spirit and scope of the present invention as defined by the following claims.

What is claimed is:

1. A method of creating a social group performed by a user device, the method comprising:
   detecting, by a location information detector of the user device, first location information of the user device;
   receiving, via an input interface of the user device, social group condition information for creating a social group;
   sending, from a processor of the user device, to a server, a request to create the social group, based on the first location information and the social group condition information, for providing a social network service;
   detecting, by the location information detector of the user device, second location information of the user device after the social group is created; and
   transmitting, by the processor, a request of transference of ownership of the social group from the user device to a device of another member of the social group when the second location information of the user device differs from the first location information,
   wherein the another member is previously set based on at least one of information of an order at which users arrive at the location, information indicating where the social group is created, and information indicating a frequency of visits to the location.

2. The method of claim 1, wherein the server provides a social network service.

3. The method of claim 1, further comprising:
   sending, to the server, a request for a social group list based on the first location information of the user device;
   receiving the social group list from the server in the user device;
   filtering the received social group list based on the information for creating the social group; and
   joining a social group selected from the filtered social group list.

4. The method of claim 1, wherein the social group condition information includes at least one piece of user-input information and information collected according to movement of the user device.

5. A non-transitory computer-readable storage medium having embodied thereon a computer program for executing a method of creating a social group by a user device, the method comprising:
   detecting, by a location information detector of the user device, first location information of the user device;
   receiving, via an input unit of the user device, social group condition information for creating a social group;
   sending, from a processor of the user device, to a server, a request to create the social group based on the first location information and the social group condition information, for providing a social network service;
   detecting, by the location information detector of the user device, second location information of the user device after the social group is created; and
   transmitting, by the processor, a request of transference of ownership of the social group from the user device to a device of another member of the social group when the second location information of the user device differs from the first location information,
   wherein the another member is previously set based on at least one of information of an order at which users arrive at the location, information indicating where the social group is created, and information indicating a frequency of visits to the location.

6. A user device comprising:
   a location information detector configured to detect location information of the user device;
   an input interface;
   a data transmitting/receiving interface configured to communicate with a server; and
   a processor configured to detect, via the location information detector, first location information of the user device, receive, via the input interface, social group condition information for creating a social group, send, to the server through the data transmitting/receiving interface, a request to create the social group based on first location information of the user device and the social group condition information, for providing a social network service, detect, via the location information detector, second location information of the user device after the social group is created, and transmit, through the data transmitting/receiving interface, a request of transference of ownership of the social group from the user device to a device of another member of the social group when the second location information of the user device differs from the first location information, wherein the another member is previously set based on at least one of information of an order at which users arrive at the location, information indicating where the social group is created, and information indicating a frequency of visits to the location.

7. The user device of claim 6, wherein the social group condition information includes at least one piece of user-input information and information collected according to movement of the user device.

8. The user device of claim 6, the processor determines whether to join the social group based on the first location information of the user device.

9. The user device of claim 8, wherein the processor sends, through the data transmitting/receiving interface to the server, a request for a social group list based on the first location information of the user device and adds the user device to the social group based on the received social group list upon receiving the requested social group list.

10. The user device of claim 9, wherein the processor filters the received social group list based on the information for creating the social group and joins the user device to the social group selected from the filtered social group list.

11. A server comprising:
a data transmitting/receiving interface configured to communicate with at least one user device;
a storage configured to store information related to a created social group; and
a processor configured to create, when location information of a user device and social group condition information, inputted by the user device, for creating a social group are received from the user device through the data transmitting/receiving interface, a social group based on the location information and the social group condition information, to store information about the created social group in the storage, and to transmit, when a request for a social group list is received from the user device through the data transmitting/receiving interface, the social group list based on the information stored in the storage to the user device, wherein the processor deletes the information about the social group stored in the storage and cancels operations corresponding to the created social group, upon a determination that current location information of each device of all members of the created social group differs from location information stored in the storage based on information received through the data transmitting/receiving interface, and wherein the another member is previously set based on at least one of information of an order at which users arrive at the location, information indicating where the social group is created, and information indicating a frequency of visits to the location.

* * * * *